UNITED STATES PATENT OFFICE.

ROBERT SPENCER, OF NEW YORK, N. Y.

IMPROVED FIRE-PROOF COMPOUND.

Specification forming part of Letters Patent No. 84,143, dated November 17, 1868.

*To all whom it may concern:*

Be it known that I, ROBERT SPENCER, of the city and county of New York, in the State of New York, have invented a new and Improved Fire-Proof Compound; and I do hereby declare that the following is a full, clear, and exact description thereof.

This invention has for its object the production of a new and useful compound which will resist the action of very high degrees of heat, and which is adapted for use in the manufacture of crucibles, pyrometers, fire-bricks, retorts, and other objects; also, for coating or lining molds in which castings are made, and for coating or lining other objects which are to be exposed to intense heat.

The improved compound consists of silicate of soda, or soluble glass, plumbago, and fire-clay.

I take equal parts of plumbago, fire-clay, and silicate of soda, and mix them thoroughly together by grinding. This forms a plastic compound, which can be molded and pressed into any desired form, and then hardened by baking.

For the purpose of forming a fire-proof paint, which will protect the surfaces of metallic and mineral substances from rapid destruction when exposed to intense heat, I take, say, equal parts of plumbago and fire-clay, reduced to a fine powder, and mix with them a sufficient quantity of silicate of soda to make a fluid, which can be applied to surfaces with a brush.

While I prefer to use equal proportions of the substances above named in the production of the molding compound, I do not confine myself to these exact proportions, as they may be varied somewhat and good results obtained.

I am aware that fire-bricks, and other objects designed for exposure to intense heat, have been made of a variety of refractory substances, such as clay, asbestus, and soapstone; but it is found in practice that such refractory substances do not cement together well, and when subjected to a high degree of heat for a long time they crumble and crack.

To obviate this objection I use, in combination with plumbago and fire-clay, the silicate of soda, which I have found will cement the two, and form a solid refractory mass, that will not crumble when exposed to intense heat and the action of sulphurous fumes.

What I claim as new, and desire to secure by Letters Patent, is—

A fire-proof molding compound or paint, composed of the within-described ingredients, mixed together in about the proportions set forth.

ROBT. SPENCER.

Witnesses:
R. T. CAMPBELL,
J. V. CAMPBELL.